(12) United States Patent
de Ameller et al.

(10) Patent No.: US 9,344,486 B2
(45) Date of Patent: May 17, 2016

(54) REMOTE GEOBROWSER CONTROL FOR COLLABORATIVE DECISION MAKING

(71) Applicants: Rafael Julio de Ameller, Bethesda, MD (US); David F. Jones, Severna Park, MD (US); Scott T. Shipley, Fairfax, VA (US)

(72) Inventors: Rafael Julio de Ameller, Bethesda, MD (US); David F. Jones, Severna Park, MD (US); Scott T. Shipley, Fairfax, VA (US)

( * ) Notice: Subject to any disclaimer, the term of this patent is extended or adjusted under 35 U.S.C. 154(b) by 518 days.

(21) Appl. No.: 13/745,154

(22) Filed: Jan. 18, 2013

(65) Prior Publication Data
US 2014/0047356 A1 Feb. 13, 2014

Related U.S. Application Data

(60) Provisional application No. 61/587,916, filed on Jan. 18, 2012.

(51) Int. Cl.
  *H04L 29/08* (2006.01)
  *H04L 29/06* (2006.01)
  *G06F 17/30* (2006.01)

(52) U.S. Cl.
  CPC .......... *H04L 67/10* (2013.01); *G06F 17/30873* (2013.01); *H04L 65/403* (2013.01); *H04L 67/02* (2013.01); *H04L 67/025* (2013.01); *H04L 67/14* (2013.01)

(58) Field of Classification Search
  CPC ............. G06Q 10/10; G06F 17/30595; G06F 17/30241; G06F 17/30873; G01C 21/26; G01C 21/20; H04L 67/10; H04L 65/403; H04L 67/025; H04L 67/14; H04L 67/02
  USPC .................... 709/205; 701/468; 707/999.102; 715/751, 753
  See application file for complete search history.

(56) References Cited

U.S. PATENT DOCUMENTS 6,678,755 B1 * 1/2004 Peterson et al. ................ 710/24
7,739,038 B2 * 6/2010 Coch ...................... G09B 29/10
                                                      340/993

(Continued)

*Primary Examiner* — Patrice Winder
*Assistant Examiner* — Aye M Aung
(74) *Attorney, Agent, or Firm* — Ober, Kaler, Grimes & Shriver; Royal W. Craig

(57) ABSTRACT

A system for collaborative decision-making and more efficient disaster management, in which multiple geobrowsers can communicate over local networks and/or the Internet to create a real collaborative experience when dealing with geospatial information, distributed using Open Geospatial Consortium (OGC) compliant KML/KMZ formats, WMS (Web Mapping Service), or and geospatial data files. All manipulation functions (dataset loading, layer stacking, layer visibility changes, Point of View (POV) changes, map extent changes, looping and animation settings, geospatial file creation and annotation drawing, and other functions) are replicated across all connected geobrowsers to create a true collaborative geospatial Common Operating Picture (COP). The leadership role can be handed over to other users if desired to build upon all the datasets and annotations sent by previous leads. Additionally the designated lead user can record the current state of the map and reproduce this on demand or automatically on other geobrowsers.

23 Claims, 13 Drawing Sheets

(56) References Cited

U.S. PATENT DOCUMENTS

| | | | |
|---|---|---|---|
| 2002/0196248 A1* | 12/2002 | Kraus | G01M 11/04 345/419 |
| 2003/0167303 A1* | 9/2003 | Zhu et al. | 709/204 |
| 2007/0064005 A1* | 3/2007 | Antoine | 345/473 |
| 2007/0174331 A1* | 7/2007 | Wolf | G06Q 10/00 |
| 2007/0255788 A1* | 11/2007 | Troung | 709/205 |
| 2008/0229213 A1* | 9/2008 | Hamilton et al. | 715/751 |
| 2009/0313272 A1* | 12/2009 | Irish et al. | 707/100 |
| 2011/0022371 A1* | 1/2011 | Bodduluri | 703/11 |
| 2011/0202851 A1* | 8/2011 | Twyman | G06Q 10/10 715/751 |
| 2013/0086156 A1* | 4/2013 | McFadzean et al. | 709/203 |

* cited by examiner

REMOTE GEOBROWSER CONTROL FOR COLLABORATIVE DECISION MAKING

CROSS-REFERENCE TO RELATED APPLICATION(S)

The present application derives priority from U.S. provisional application 61/587,916 filed 18 Jan. 2012.

BACKGROUND OF THE INVENTION

1. Field of the Invention

The present invention relates to network-based collaboration tools, and more particularly, to a geobrowser collaboration system which synchronizes and shares information among multiple remote geobrowsers for data visualization and collaborative decision-making in emergency and other situations.

2. Description of the Background

Geobrowsers allow the integration of disparate datasets available on the internet by mapping them onto 3D virtual globes, 2D maps or other geolocated datasets. Open source geobrowsers such as NASA's World Wind and commercially licensed geobrowsers such as Google™ Earth and ESRI's ArcGlobe, ESRI's Flex Viewers and Google™ Maps are widely used by the general public as well as by researchers, decision and policy makers, emergency management and government officials. It is possible to integrate various datasets into these geobrowsers, giving users new data visualizations and new analysis capabilities. Such datasets may, for example, include spatially referenced data such as satellite and aerial imagery, digital terrain models, vector data such as locations, water bodies and buildings, and real-time coordinate data for location-tracking. All may be placed on the 2D map or 3D globe surface and displayed at their proper geographic location. Geobrowsers are expected to have a significant impact on managing knowledge, structuring workflow, and communications. Google Earth's user base is more than 500 million users, and NASA estimates that World Wind attracted 10 million users within the first year of operation.

Geobrowsers have untapped potential in situations where multiple users collaborate, working together in a coordinated fashion, towards a common goal. Large scale natural disasters such as hurricanes, earthquakes, forest fires or flash floods, require coordinated action to allocate resources and deploy the most appropriate response. Decision makers, emergency response personnel and public administrators typically need to be capable of accessing, distributing and processing a wide range of map information including earth observation data, geographical information and spatially-mapped live sensor data such as real-time video, satellite storm imagery, and other useful datasets. The ability to access such resources on a 2D or 3D geobrowser would be extremely valuable for emergency management and disaster mitigation.

The ability for multiple remote users to access such resources and collaborate on the geobrowser has the potential to help save lives, limit damage, and reduce the costs of dealing with emergencies. Geospatial collaboration should be an essential part of every stage of emergency management, from planning through response and recovery to mitigation of future emergencies. Unfortunately, geobrowsers cannot collaborate, there are no third party collaboration tools suitable for geobrowser collaboration, and so the foregoing potential is entirely unmet.

Users themselves have tried a few ad hoc attempts at solutions. For example, geospatial data collaboration has been attempted using generic screen-sharing presentation software such as Cisco WebEx™ or Microsoft SharePoint™, and project collaboration tools such as Basecamp, Google™ Docs and Wiggio. However, this ad hoc approach only provides multiple remote users with the ability to view a common screen and exchange communications. Users only see a replica of the lead collaborator's geobrowser and whatever datasets and annotations were on it. This is similar to watching television, suppresses participation, and fails to engage the collaborators. Participants cannot add to the lead's geobrowser any additional data or information. Additionally, when the screen-sharing presentation is completed any geospatial data used by the lead collaborator is no longer available for the other participants, and they cannot review it or merge it with other datasets on their local systems.

United States Patent Application No. 20070174331 by Wolf et al. shows a collaboration system that maintains spatial reference information for collaborative visualization. A web-enabled database of business data points can be displayed simultaneously on multiple collaborators' visual screens. As one collaborator updates a point location the others see the change in their visualizations. It appears that this is done simply by associating spatial reference information with the business data points, and displaying on a shared map using Microsoft Sharepoint™, a known platform for document and file collaboration.

There is no geobrowser collaboration system that allows collaboration among users of different geobrowsers, let alone controlled sharing in which remote users selectively control, edit, and manipulate shared content in real time such as geospatial datasets. What is needed is a collaboration system for allowing multiple geobrowsers to communicate over local networks and the Internet to create a real collaborative experience over computer desktops for collaborative decision making that delivers accurate information on emerging situations while collaborating with multiple remotely-located partners, advisors, experts, specialists and authorities in various jurisdictions, regardless of the geobrowser, hardware or operating systems used. The present invention provides a true "hands-on" geo-experience for all participants, allowing users to manipulate and understand shared datasets on their own geobrowser virtual globe or geolocated map of choice, much more efficiently than by any other known method. This results in an enhanced user experience, which promotes engagement, and translates into increased awareness and understanding of emergency conditions.

SUMMARY OF THE INVENTION

It is, therefore, an object of the present innovation to provide a geobrowser collaboration system that establishes a common operating picture amongst multiple remote users of geobrowsers, and a lead user actually controls, edits, and manipulates the common operating picture for collaborative data visualization and decision-making in emergency and other situations.

It is another object to provide a geobrowser collaboration system with a host protocol in which one designated lead user actually controls, edits, and manipulates the shared content while remote users passively view the shared content, and yet the lead control may be exchanged to any user at any time.

It is another object to provide a geobrowser collaboration system in which all the functions performed on the leader's virtual globe (or other geolocated map of choice) are executed across all the collaboration participants' geobrowsers, including functions like dataset loading, layer stacking, layer visibility changes, Point of View (POV) changes (for a 3D map) or its 2D corollary map extent changes, looping and animation settings and geospatial file creation and annotation drawing, thereby creating a true geospatial Common Operating Picture (COP).

It is another object to provide a lead transfer protocol to facilitate joint changes by multiple leaders, for example, in joint editing of a forecast by editors who are responsible for different sections/zones of the forecast region, or field participants who are appending information to a virtual globe or other geolocated mapping system.

It is another object to provide a geobrowser collaboration system in which leader control, editing, and manipulation of the common operating picture does not jeopardize integrity of the geobrowser session content.

It is another object to provide a geobrowser collaboration system where the designated lead user can record the state of the map (loaded data, layer stacks, layer visibilities, Point of View (POV) (for a 3D map) or its 2D corollary map extent changes, annotations, drawings, looping and animation settings at any one instance) and reproduce this on demand or automatically on other geobrowsers. The state of the map can be used as a bookmark during a collaborative briefing ("briefmarks"), broadcast to remote users for them to follow automatically, stored as a public link for future use on any geobrowser, sent by email transmission, or otherwise stored and/or transmitted as a permanent archive.

The solution described herein enhances collaborative decision making and facilitates more efficient disaster management, from pre to post disaster, including rapidly deployable distributed networks to support larger geographic areas of first responders. In one embodiment designed for emergency response coordination, the present system provides a platform by which multiple geobrowsers can communicate over local networks and the Internet to create a real collaborative experience over computer desktop geobrowsers when dealing with geospatial information distributed using Open Geospatial Consortium (OGC) compliant KML/KMZ formats and WMS (Web Mapping Service), as well as other geospatial data formats (GeoTiffs, Shapefiles, GeoJPEGs, etc.). It facilitates a collaborative decision environment that delivers accurate information on emerging situations while collaborating with distributed partners, advisors, specialists and authorities in any location. All the functions like dataset loading, layer stacking, Point of View (POV) changes (for a 3D map) or its 2D corollary map extent changes, animation settings and annotations are replicated across all the connected geobrowsers, effectively creating a true collaborative geospatial Common Operating Picture (COP). Lead collaborator functions can be passed on to any of the other participants in the collaboration at any time, allowing them to build upon the collaborative COP, which is already on their desktop. Since the collaboration is built upon the virtual globe or other geolocated mapping system on each user's desktop, and there are no screen switches or changes to the base map as new datasets or annotations are added, the user never loses his situational awareness. The present system is capable of collaboration between multiple different virtual globes or geolocated maps at one time.

Other objects, features, and advantages of the present invention will become more apparent from the following detailed description of the preferred embodiments and certain modifications thereof.

BRIEF DESCRIPTION OF THE DRAWINGS

The objects, features, and advantages of the present invention will become apparent from the following detailed description of the preferred embodiments and certain modifications thereof when taken together with the accompanying drawings in which like numbers represent like items throughout and in which.

DETAILED DESCRIPTION OF THE PREFERRED EMBODIMENT

The present invention is a system for allowing multiple geobrowsers to communicate over local networks and/or the Internet to create a real-time collaborative experience with 3D virtual globes, geospatial data, 2D maps and other georeferenced data. One skilled in the art should understand that the present system also facilitates collaboration using any webpage, databases, presentation and multimedia files and/or images, and is not limited to geobrowser collaboration per se, but has broader applicability. However, the system was specifically designed for geobrowser collaboration and for purposes of illustration shall be explained in this context. Collaboration sessions are conducted by a lead collaborator with any number of collaboration participants, all using their geobrowser of choice. As each participant connects to a collaboration session all the functions performed on the leader's geobrowser are executed across all the participants' geobrowsers. Key functions like dataset loading, layer stacking, layer visibilities, Point of View (POV) changes (for a 3D map) or its 2D corollary map extent changes, animation settings, drawings and annotations are replicated across all the connected geobrowsers, effectively creating a true geospatial Common Operating Picture (COP) and full situational awareness. In addition, a novel lead/follow protocol is established in which lead collaborator functions can be passed on to any of the other participants in the collaboration at any time, allowing them to build upon the collaborative COP. Participants arriving late to a collaborative session will load all the datasets and go through all the commands sequentially (without missing any dataset, annotation or map view), at an accelerated pace, allowing them to "catch up" with the real-time collaboration. These functions allow all participants to maintain situational awareness regardless of their arrival time to the collaboration (late arrivals will see everything that has been discussed and annotated on the map, allowing them to have a complete picture of the presentation they would have missed with other technologies). This functionality is especially useful when users are faced with low bandwidths or network disruptions, which are probable during emergency situations. Other technologies do not allow users to maintain this situational awareness during a network disruption or low bandwidth. Additionally, this functionality also allows users to review the collaboration sessions by "reloading" the sessions at a future time or date.

Figure 1:
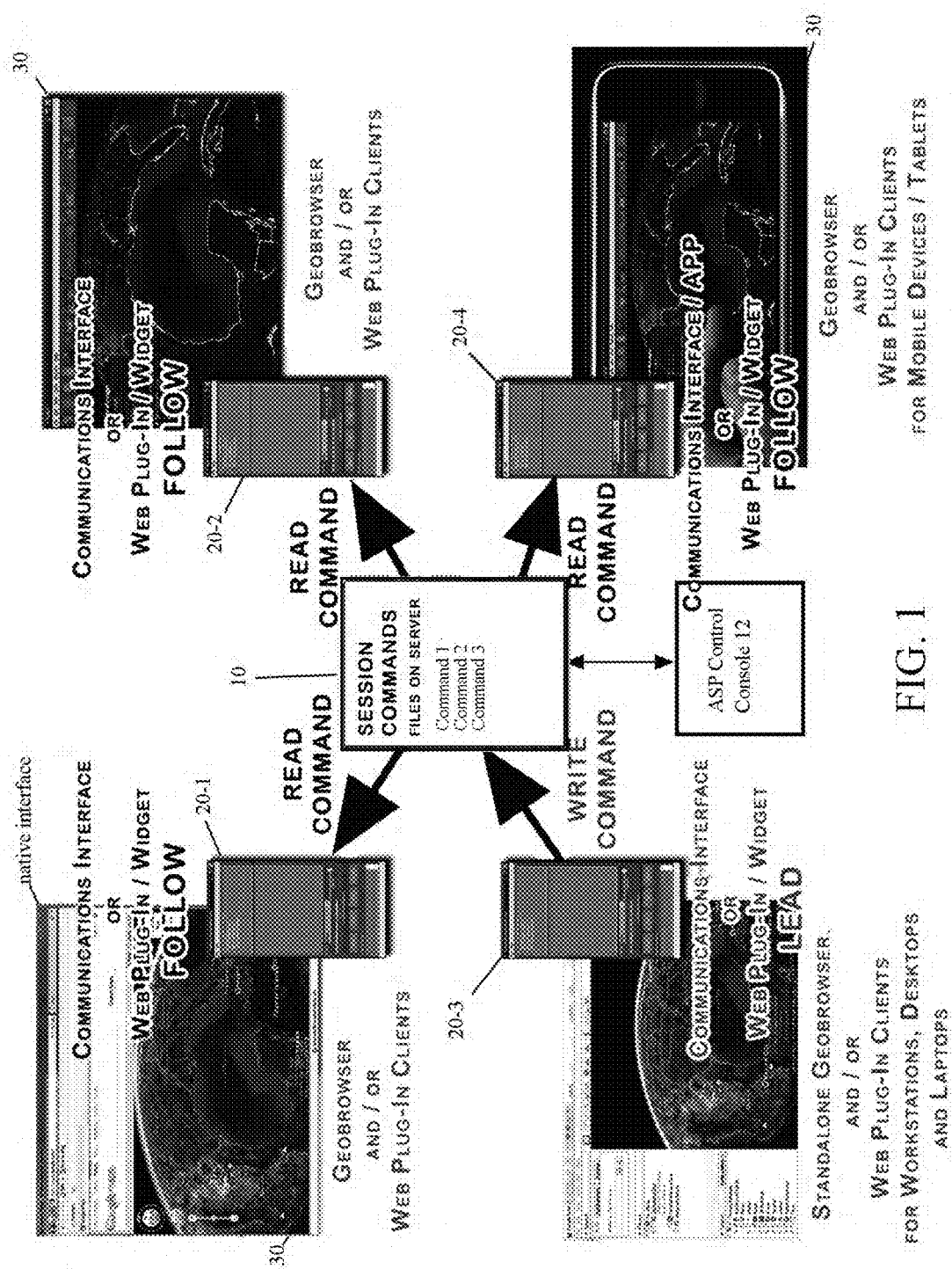
FIG. 1 is a diagram illustrating the network architecture of the present invention including transmission of commands between geobrowsers, including a designed Leader 20-3 and multiple Followers 20-1, -2 and -4. The Leader can be designated to be any participant 20-1 . . . n.
Figure 2:
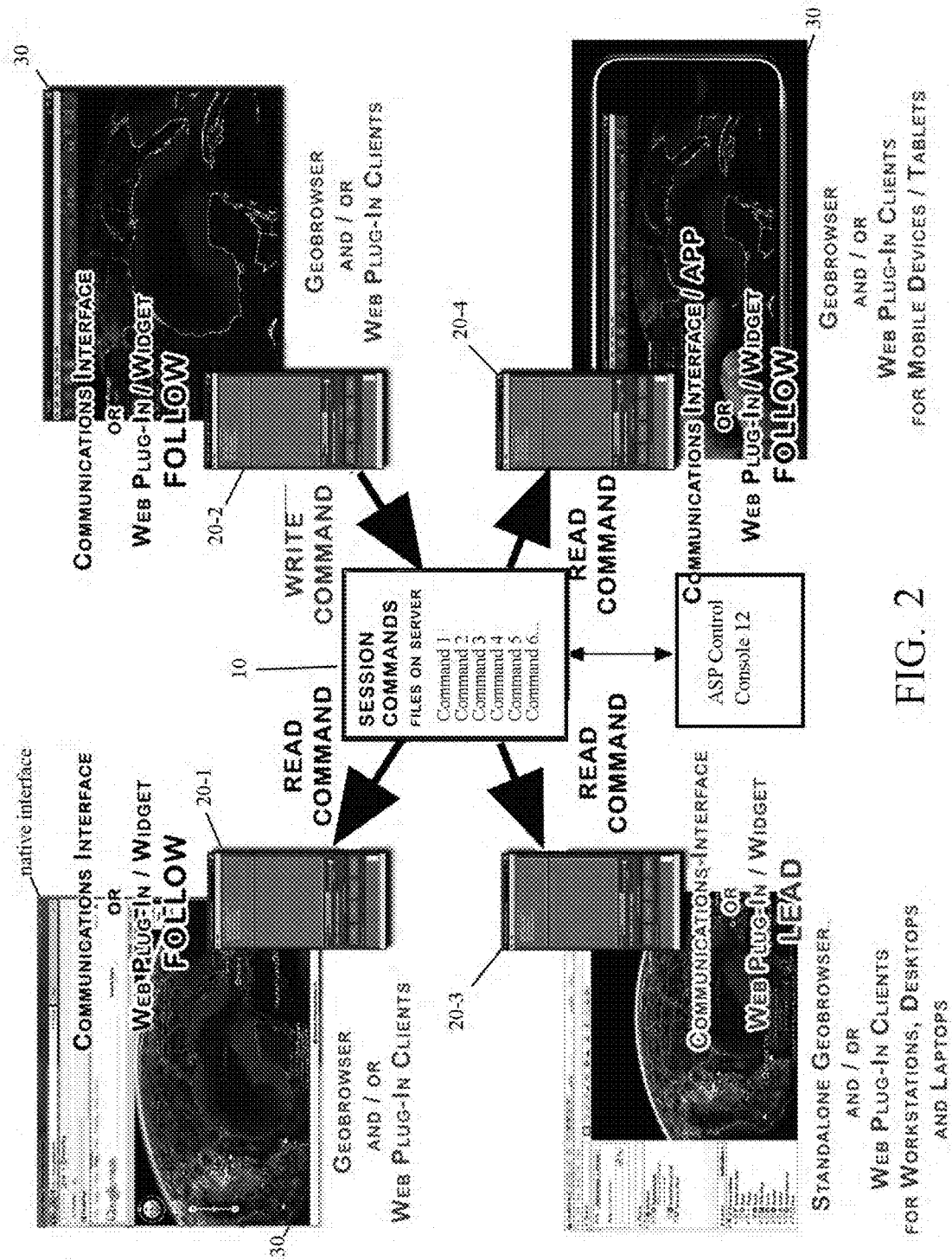
FIG. 2 is similar to FIG. 1 except that the lead has been yielded to a different participant.

FIGS. 1-2 are diagrams illustrating the network architecture of the present invention including transmission of commands between geobrowsers and the handover (or "yield") of leadership to another participant. The architecture is a distributed client-server system comprising an internet-enabled collaboration Host 10 in network communication with any number of remote client stations 20-1 . . . n. Host 10 can be implemented on a single server or multiple servers, and can be based on any well-known server environment including one or more central processing units, volatile memory (e.g. random access memory), persistent memory (e.g. hard disk devices) and network interfaces to allow Host 10 to communicate over the internet. The nature of web Host 10 and the communication links to client devices 20-1 . . . n may be any combination of architectures that will support interactions between client devices 20-1 . . . n and Host 10. The network communication links may include the Internet as well as any other appropriate gateways between client devices 20-1 . . . n and Host 10, using any network infrastructure (e.g. Global System for Mobile communications ("GSM"); Code Division Multiple Access ("CDMA"), Enhanced Data rates for GSM Evolution ("EDGE"), Evolution Data-Optimized ("EV-DO"), High Speed Downlink Packet Access ("HSPDA").) or wireless local area network ("WLAN") infrastructures such as the Institute for Electrical and Electronic Engineers ("IEEE") 802.11 Standard (and its variants), or Bluetooth or the like.

The client stations 20-1 . . . n may be any computing devices equipped with any native geobrowser application such as, for example, World Wind 1.4 (WW.NET), World Wind Java (WWJava), Google Earth™ (standalone or Web API), Google™ Maps, The Integrated Data Viewer (IDV) from Unidata, ESRI ArcGIS Explorer®, Microsoft® Virtual Earth (Bing), COAST (Coastal On-line Assessment and Synthesis Tool), ESRI Flex Viewer (Flash SWF), ESRI Flex API or any other native geobrowser. The Host 10 remains under application-service-provider (ASP) control via an ASP control console 12.

When a user seeks to use the system of the present invention from a standalone client station 20 for the first time, they may use any suitable browser application such as Google Chrome® 10, or Firefox®, or Internet Explorer® to connect to the Host 10 and register. Upon registration the collaboration Host 10 pushes out a self-installable RIA Communication Management Module (CMM) 30 which will run on the client device 20, either installing itself as a plugin to the native geobrowser application or utilizing an application programming interface (API) specification to communicate and control the native geobrowser.

When a user seeks to use the system of the present invention from a web plug-in client station 20, they may use any suitable browser application such as Google Chrome®, or Firefox®, or Internet Explorer® to connect to the Host 10 and register. Upon registration the collaboration Host 10 shares with the web browser the necessary Flash (SWF) modules, Flex files, Java script, HTML5 or web plug-in code that comprises the CMM 30, which are loaded on-demand by the web browser. In this case they can run independently of a standalone application.

Client devices 20-1 . . . n can be equipped with any combination of standalone or web plug-in CMMs 30-1 . . . n, respectively, allowing the system to work with any combination of geobrowser web plug-in interfaces 30-1 . . . n and/or standalone installed on the PC, MAC or Workstation.

One skilled in the art will readily understand that client devices 20-1 . . . n may be any combination of smartphones, tablet computers or other mobile devices, in which case the standalone CMMs 30 are Mobile Applications (APPs) installed on the mobile device.

When a registered user in possession of a client-station 20-1 . . . n seeks to subscribe to a collaboration session, they execute both their native geobrowser application to launch its virtual globe or 2D map, and their CMM 30. Generally, where CMM 30 is a rich interne application (RIA) plugin it can be executed from the tools menu within the geobrowser. Where CMM 30 is a standalone Java-API executable application it runs independently, but in this case CMM 30 may be programmed so that its execution starts the geobrowser as well. In both cases the CMM 30 provides a local collaboration user interface on client stations 20-1 . . . n, and allows the user to quickly establish a secure communication pathway to Host 10, and to share geobrowser control with Host 10, allowing the native geobrowser application to accept commands either locally from the user or indirectly via Host 10.

The CMM 30 includes Internet and/or server-based communication protocols through which the CMM 30 communicates with the Host 10. Host 10 also establishes a lead/follow protocol (to be described), allocating the lead collaborator role to one or more designated client station, for example, 20-4 (the "Leader"). For purposes of illustration the present system will be described as designating just one leader at a time, but it should be apparent that collaboration with multiple designated Leaders is also possible. Host 10 compiles a command stack of geobrowser control commands from the appointed Leader 20-4 and stores the command stack locally, remotely or on cloud. The CMM 30 for all other "Participants" clients 20-1 . . . n periodically monitors (pings) the Host 10 for new commands entered on the command stack and, when it finds one, the command is executed by all Participants 20-1 . . . 3. Given this configuration all geobrowser controls and commands executed by the Leader client station 20-4 are executed concurrently and automatically on all Participant client stations 20-1 . . . 3 milliseconds later, and yet the other clients 20-1 . . . 3 remain free to exercise their own local geobrowser controls with no effect on the collaboration. Importantly, the Leader role can be passed to another Participant at any time in accordance with the lead/follow protocol. The Host 10 only enters commands from the Leader 20-4 onto the command stack for retrieval by Participants 20-1-3. Thus, rather than broadcasting an image of the lead geobrowser to each client station 20, each collaboration session is built upon the virtual globe on each user's desktop under supplemental control of the Communication Management Module 30. Consequently, there are no screen switches or changes to the base map as new datasets or annotations are added, the user never loses his situational awareness. The Leader role is transferable, and as the role is transferred new lead collaborators can add their own geospatial datasets without losing the annotations, drawings and datasets that have been shared so far by past lead collaborators. All collaboration session commands added by each leader are logged as Session Commands on the Host Server 10 as seen in FIG. 1.

FIG. 2 is similar to FIG. 1 except that the lead has been yielded to a different participant, which results in transmitting and appending additional Session Commands to the collaboration session already begun by the previous leader. FIG. 2 illustrates a changed Leader 20-2 and multiple Followers 20-1, -3 and -4. The Leader can be designated to be any participant 20-1 . . . n.

This lead/follow protocol is essential for decision makers, who are frequently not GIS expert and require visualizing their own digital assets on a map, such as firefighter engine positions together with other relevant datasets, such as NASA satellite wildfire hotspots, creating actionable geospatial information to make better informed and timelier decisions. Additionally, at the end of each collaboration session each user has the full set of original datasets shared and annotations created during the collaboration on their personal geobrowser still active on their computer. Users can revisit past collaboration sessions and load the datasets on any computer connected to the internet at any time. Sessions may be stored locally at Host 10, on a remote server, or on the cloud.

The CMM 30 (plugin or API on the client devices 20-1 . . . n) and Host 10 software form a synchronized collaboration system (e.g., a synchronized co-browsing system) wherein any number of clients 20 running the CMMs 30 literally plug or patch into the synchronization framework.

The CMMs 30 can be implemented as object-oriented user-control interfaces using an object-oriented programming language, such as C++, PHP, or any other suitable language. The CMM 30 communication to the Host 20 may be implemented using a conventional http POSTdata method posting data to server-side PHP scripts, which implementation is synchronous.

The Host 10 software includes an interpreter for receiving posted data from clients 20, authenticating/filtering data from the designated lead client 20-4, and selectively adding data from the lead client 20-3 to a command stack for retrieval by the other collaborating clients 20-1-3. Thus, the Host 10 may run a conventional Hypertext Preprocessor (PHP) interpreter for receiving posted PHP data/commands from clients 20. PHP is a widely-used general-purpose scripting language that is especially suited for Web development and can be embedded into HTML. This way, any PHP code in a received file is executed by the PHP engine to create dynamic web page content or dynamic images that can be used on client devices 20 in their CMM plugins 30. One skilled in the art will readily understand that the scripts may alternatively be implemented as Common Gateway Interface (CGI) scripts, or may be implemented using instructions provided in accordance with any of the known C/C++, Java™ or Python™ programming languages, or any other server-side scripts in any suitable scripting languages capable of providing dynamic content from web Host 10 to clients 20. Similarly, any of a variety of data transfer protocols may be used such as FTP, HTTP, Python and Java.

The Host 10 interpreter authenticates commands sent from the client CMM plugins 30 and determines whether these are lead commands from the designated leader 20-4 or follow commands from Participants 20-1-3. Only authenticated commands from Leader 20-4 are added to the Host 10 command stack for retrieval by the Participant clients 20.

For example, when a session is initiated, multiple clients 20-1 . . . n may be connected through an interne link to the central Host 10. The Host 10 software accepts commands from the current Leader and adds them to a master "Session Command" files. The master Session command files are a transaction log file that captures all servicing activities on the Host 10. One skilled in the art should understand that master transaction log is not limited to XML, but could be straight text, UNICODE, or any other suitable format (although XML is presently preferred). Thus, as seen in FIG. 1, the Communication Management Module 30 accepts authenticated commands from the current lead collaborator 20-3, and adds them to the master session command files (Command 1). Each client's CMM 30 sends a ping every few seconds once a session has been initialized to check for new commands in the Host 10 session command files. Every time a Client 20 finds one or more new commands, the Client 20 reads them into its local copy of the session command files and immediately executes them. In effect, all collaborating clients receive the Leader's commands in near real time and they are executed by the CMMs 30 locally and individually on their respective native geobrowsers (READ COMMAND—Commands 2 and 3). Only one collaborator can act as Session Lead at any given time, and that collaborator assumes control of the session (Session Lead Status). The Session Lead can pass the lead to any other collaborator at any time, with one exception. If a user is logged in as Session Administrator via ASP Control Console 12 they can block transfer of the Lead. A Session Administrator is identified at the beginning of each Session, and that Administrator may override a Session Lead at any time to gain control of the Session. If the lead is handed over to a different client station, say 20-4, the central Host 10 appends new commands from the new LEAD 20-4 and adds them to the "Session Commands" (WRITE COMMAND— Commands 4, 5 and 6). All client station plugins receive and execute the commands individually on their local geobrowser (READ COMMAND—Commands 4, 5 and 6). Sessions are defined and recorded using a sequence of plain text "Session Command" files. The Session Command files are edited (written to) by the Session Lead, and local copies of the "Session Command" files are maintained at each client station 20-1 . . . n for each collaborator over the network connection. The "Session Commands" serve as a recording of the session and can be saved, replayed and/or manually edited, and the Leader may also copy content from a prior session into an active session. This way, an archive of past commands always exists on the Host 10 and this allows users to join sessions that are already in progress without missing any of the commands. Users can also revisit archived sessions and re-live them step-by-step using their geobrowsers.

Figure 3:
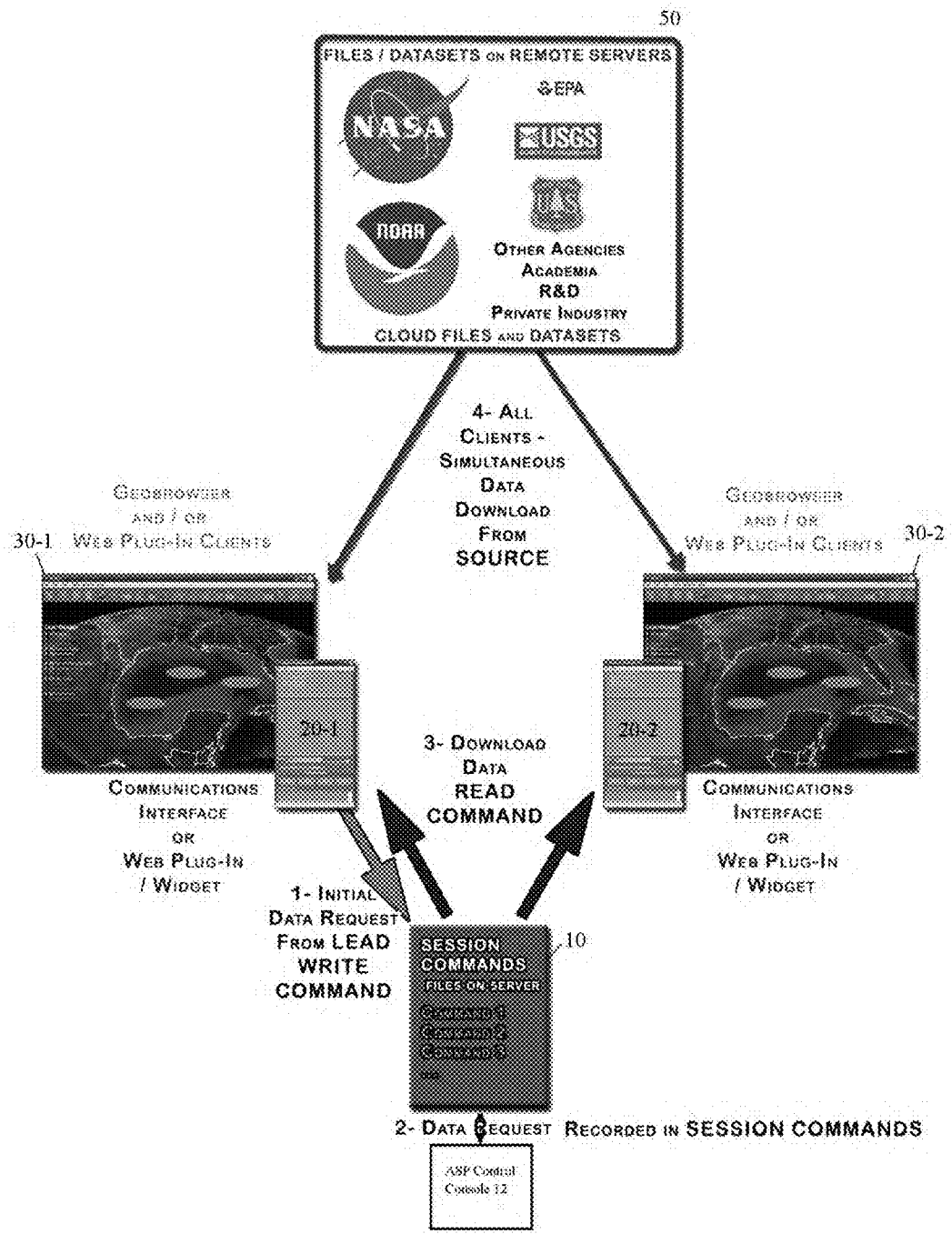
FIG. 3 is a flow diagram illustrating the process of remote loading of a dataset from a remote server or the cloud.

FIG. 3 is a flow diagram illustrating the process of remote loading of a dataset from a remote server 50 (or the cloud). If client station 20-1 is LEAD, at step 1 the LEAD 20-1 issues a command such as, for example, a Lead Write Command. The Host 10 accepts the Lead Write command from the current lead collaborator 20-1 at step 2 and adds the Lead Write command to the master session command files. The Clients 20 all periodically ping the Host 10 for new commands and, when they find the new Lead Write command in the master session command files, they read it and immediately execute it at step 3. The new command is executed on all clients 20-2 . . . n. At step 4, all collaborating clients 20-1 . . . n receive and execute the same synchronous commands on their geobrowser, but individually and separately. This facilitates use of different geobrowsers in the same collaboration session. For commands that seek access to other systems (such as, for example, access to a third party dataset), collaborators must acquire the dataset direct from the third party via the Internet. Thus, clients must also have access permissions and connectivity. Each collaborator may decouple from the session at their discretion, with the exception of the Session Lead, who cannot decouple while acting as Lead. The "Session command" files will continue to update, so that any decoupled collaborator can rejoin the session. The client CMM plugins 30 can be installed on any type of computing device including tablets and smartphones.

Similarly, when Lead Client 20-1 loads a dataset by using the CMM 30 interface, a command via the network Host 10 is sent to the CMM plugin 30 on client 20-4, whereupon that geobrowser will load the same dataset.

Figure 4:
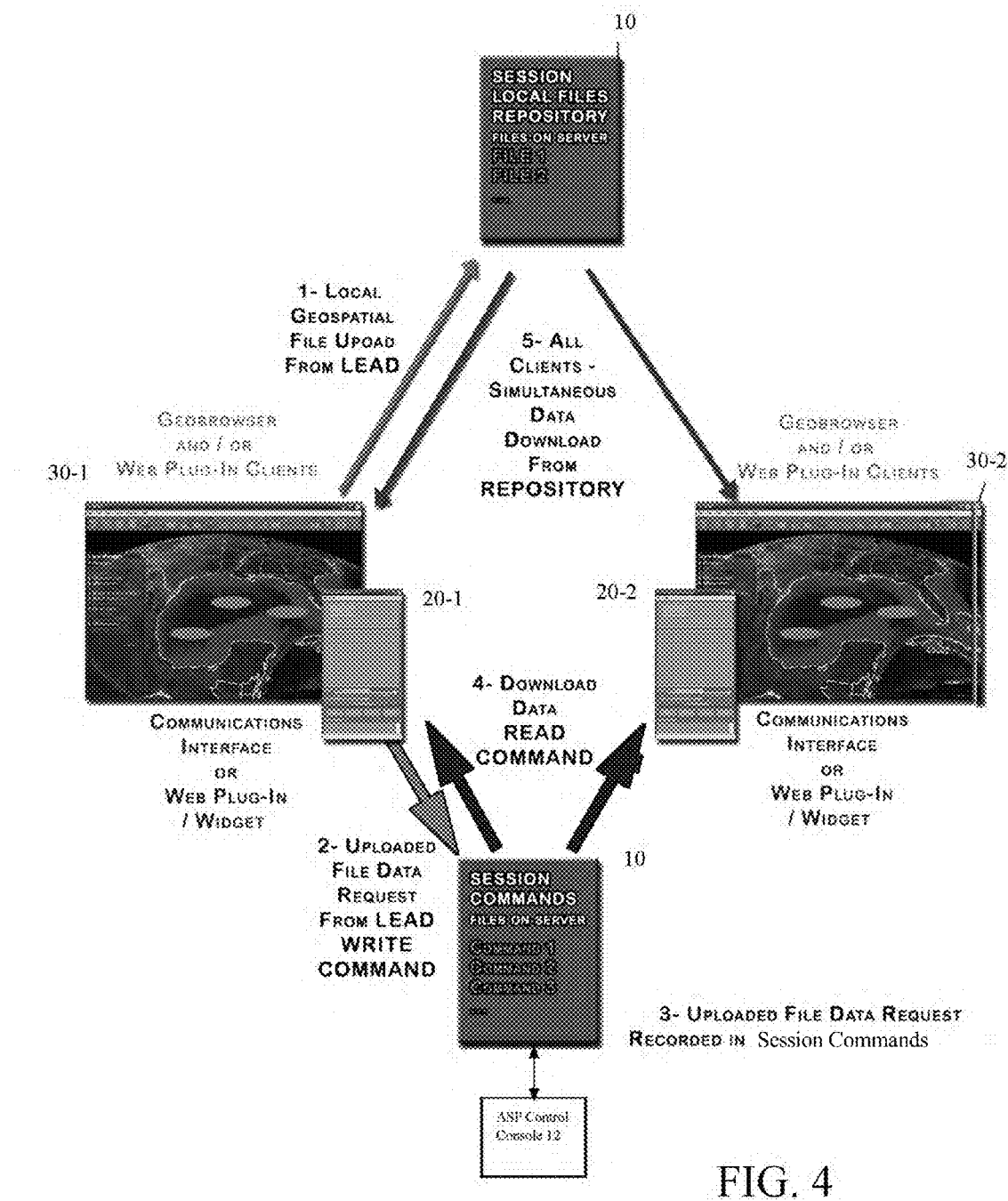
FIG. 4 is a flow diagram illustrating the process of loading a local dataset from the lead geobrowser onto a data repository for distribution between all participants.

FIG. 4 is a flow diagram illustrating the process of loading a local dataset from the lead geobrowser 20-1 onto a data repository for distribution between all participants 20-1 . . . n. At step 1 the LEAD 20-1 issues a local dataset request command to Host 10. The Host 10 accepts the local dataset request command from the current lead collaborator 20-1 at step 2 and adds the local dataset request command to the master session command files at step 3. The Clients 20 all periodically ping the Host 10 for new commands and, when they find the new local dataset request command in the master session command files, they read it and immediately execute it at step 4. At step 5, all collaborating clients 20-1 . . . n download the same local dataset for use on their geobrowser, but individually and separately. This way, if the lead collaborator on Client 20-1 points to a KML or KMZ file on the interface and loads it on his geobrowser, the commands are implemented on Client 20-4 milliseconds later. This facilitates use of different geobrowsers in the same collaboration session. For commands that seek access to other systems (such as, for example, access to a third party dataset), collaborators must acquire the dataset direct from the third party via the Internet. Thus, clients must also have access permissions and connectivity. Each collaborator may decouple from the session at their discretion, with the exception of the Session Lead, who cannot decouple while acting as Lead. The "Session command" files will continue to update, so that any decoupled collaborator can rejoin the session. The client CMM plugins 30 can be installed on any type of computing device including tablets and smartphones.

This way, critical datasets for weather analysis, situational awareness, location-based datasets, climate observations from satellites, model forecasts, storm surge forecasts, NOAA research models, aviation hazards, active volcanoes, NASA research satellite data and more can be shared with ease between emergency managers, government officials, decision makers, political leaders and even responders on the ground.

These datasets include but are not limited to:
  NWS AWIPS data (via FX-Net export);
  NOAA NWS GIS products;
  NASA Earth Observation products (including research datasets);
  Texas Division of Emergency Management (DEM) products (including research datasets);
  USGS satellite imagery and GIS products;
  Forest Service datasets.
  Research and academia datasets
  Multimedia/presentation files and datasets
  Private sector datasets
  Military datasets The Session Lead capabilities include navigation functions to pan, zoom, tilt and rotate the geobrowser rendering. The Session Lead can also annotate the rendering with manual drawings, text or symbols. Operations on WMS and KML/KMZ or any geolocated content can be shared over the network during a Session.

One of the robust features of the present invention is a software feature that allows the designated LEAD participant 20-1 to record the "state of the map", which is a comprehensive session content and configuration snapshot at a given point in time. Given the state of the map the LEAD participant 20-1 can reproduce a session on demand both locally and automatically on other geobrowsers 20-2 . . . n. The state of the map also serves as a bookmark during a collaborative briefing (e.g., a "briefmark"), and briefmarks can be broadcast for remote users to follow automatically or made available for email transmission or stored for future use on any geobrowser 20-1 . . . n by making a web link available.

Figure 5:
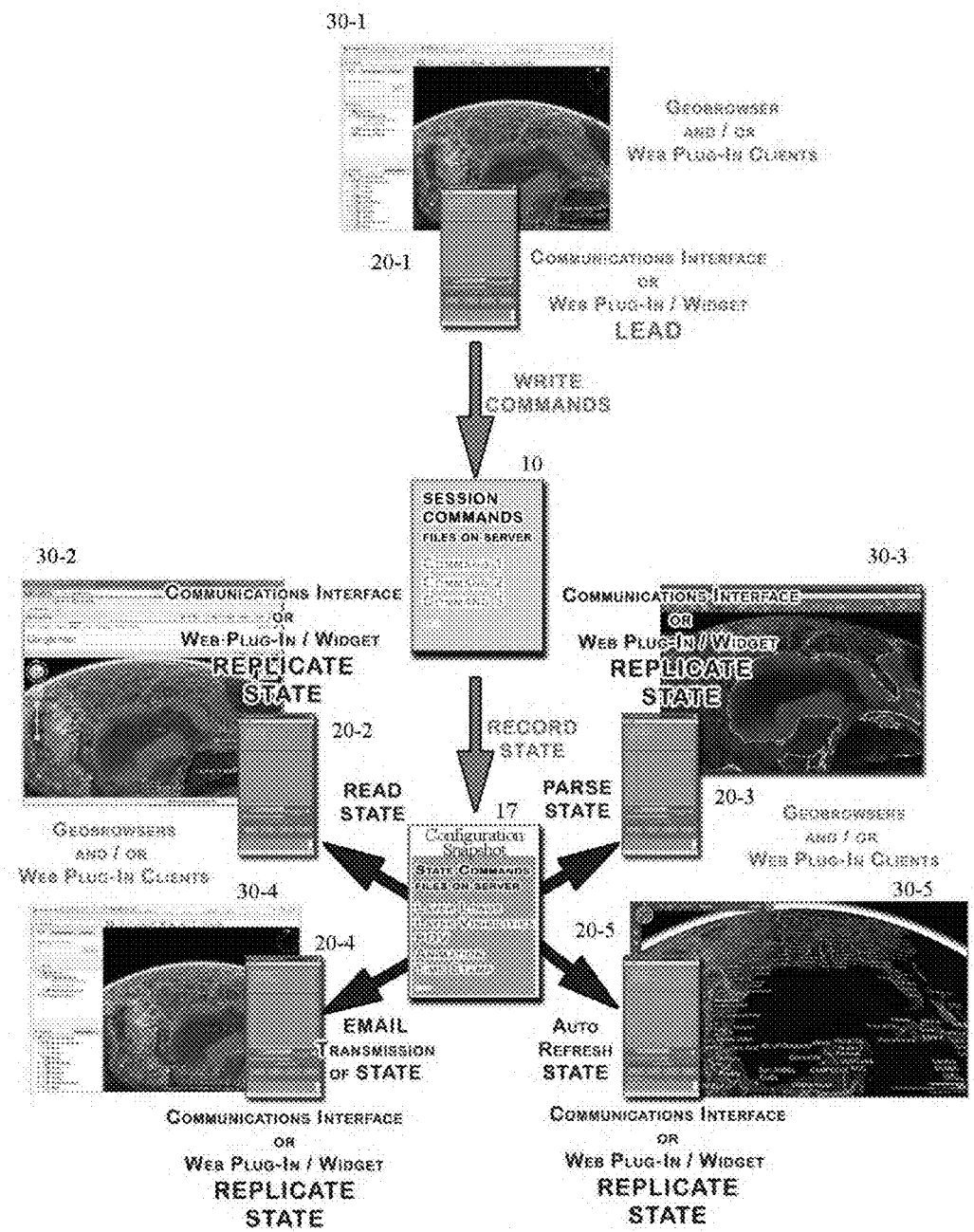
FIG. 5 is a diagram illustrating the network architecture of the present invention when saving and distributing a state of the map from the session commands available.

FIG. 5 is a diagram illustrating the network architecture of the present invention and process of saving and distributing a state of the map from the session commands available. This diagram includes a Leader 20-1 and multiple real-time follower participants (all "displaced time state loaders") 20-2, 3, 4 and 5. Leader 20-1 initiates a record the "state of the map" control from his geobrowser which will record a configuration snapshot 17 with all the necessary "SESSION COMMANDS" from the Host 10 server to replicate the state of 30-1 and records it to the Host 10 server and locally on the user's machine if desired. It is noteworthy that the state of the map may not need all the commands in the stack to replicate the state, and so only a subset of Session Commands that are relevant to the current state of the map may be recorded. For example, where a sequence of Session Commands specify multiple POVs, only the latest POV is needed and is recorded. Previous POVs are discarded when recording a state. Additionally the Lead records a "replicate state" command to the command stack on Host 10. The configuration snapshot 17 is created by reading through the commands from the command stack on host 10 to replicate the current state of the map on 30-1. The recording of configuration snapshot by the Leader 20-1 can be set to automatically record it periodically if desired or on demand. Either the Leader client station 20-1 or code on Host 10 can create this configuration snapshot 17, which includes but is not limited to: latest POV (or map extent), layer loads, layer stacking, current layer visibilities, drawings, annotations, animation state and current time and date displayed. Given the configuration snapshot 17, the execution of the state replication on client stations 20-2, 3, 4 and 5 can be performed in different ways.

In the case of client station 20-2, the 20-2 interface will receive the "replicate state" command sent before by the Leader 20-1 and read the necessary commands from the command stack on Host 10 to make the necessary changes to 30-2 to replicate the state of 30-1. This application is useful to record briefing bookmarks, used to organize a presentation ("briefmarks"), or to pre-load datasets on all collaborating client stations before a starting a briefing.

Client station 20-3 will interpret the State Commands directly from the State Commands configuration snapshot 17 saved on the Host 10 from the command stack. This can be done real time during a collaboration by having the client station 20-3 periodically monitor the configuration snapshot 17 for changes or new configuration snapshots, or at a future time on demand.

Client station 20-4 receives the configuration snapshot created from the command stack either from the server or from the leader via email transmission. The client station 20-4 can connect to the email server directly or have the information fed by the user.

Client station 20-5 checks the server periodically for any changes to configuration snapshot 17 (created from the command stack) and immediately executes a state replication on 30-5 to replicate 30-1 when a change of the configuration snapshot 17 or a new configuration snapshot 17 is detected on Host 10. This can be done real time during a collaboration, or at a displaced time.

Again the Leader can be designated to be any participant 20-1 . . . n. The state of the map can be broadcast directly to other participants 20-2, 3, 4 and 5 or transmitted via other means, such as email or by web link for real-time or future use.

Figure 6:
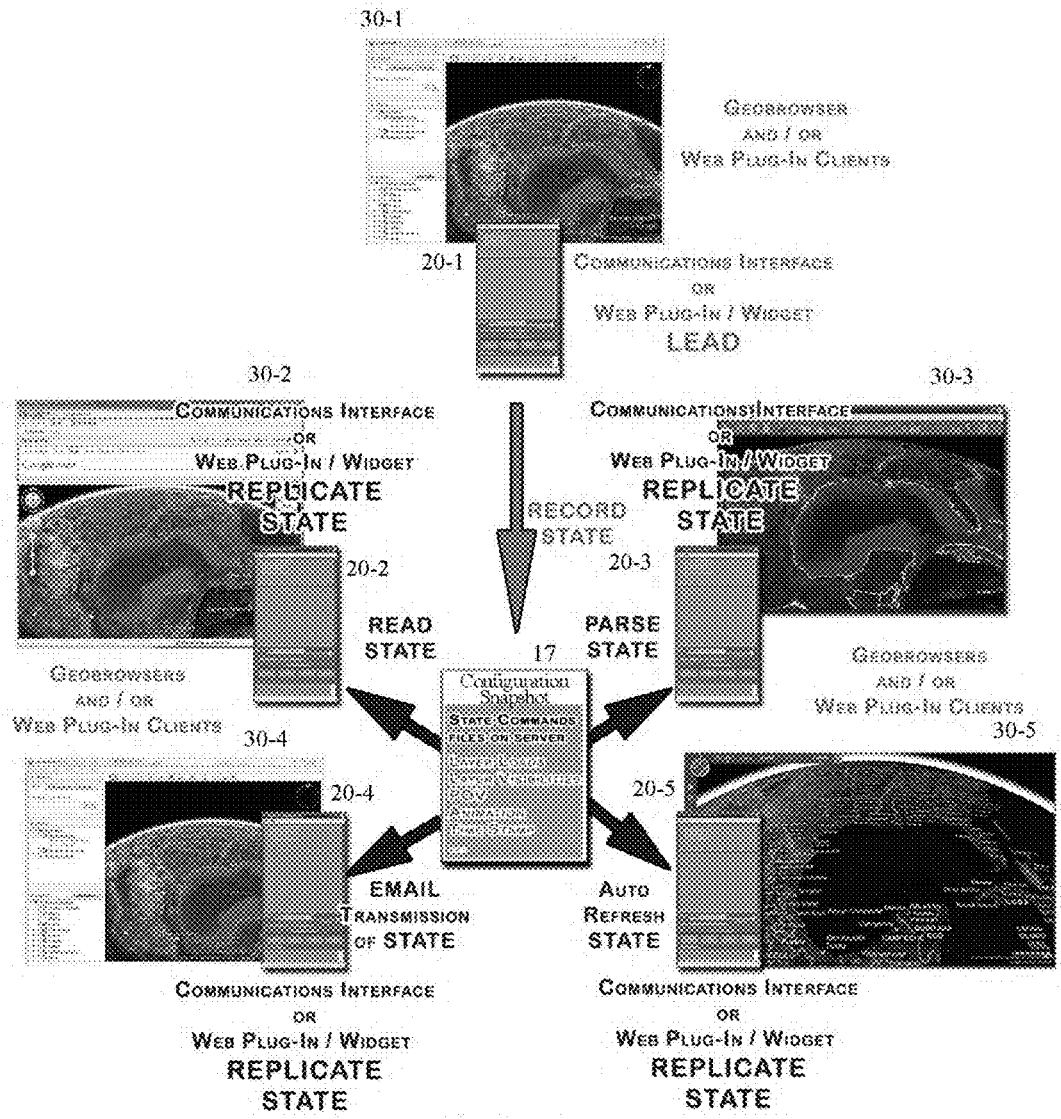
FIG. 6 is a diagram illustrating the network architecture of the present invention when saving and distributing a state of the map directly from the lead geobrowser.

FIG. 6 is a diagram illustrating the network architecture of the present invention and process of saving and distributing a state of the map directly by reading the current state of leader geobrowser 30-1 and recording that to configuration snapshot 17, stored on Host 10 and recorded locally if desired. This process is different from the one presented in FIG. 5 in that the state is not obtained by reading through the command stack on Host 10, but by reading it directly from 30-1 though 20-1. Additionally the Lead records a "replicate state" command to the command stack on Host 10. As above this diagram includes a Leader 20-1 and multiple follower participants 20-2, 3, 4 and 5, but the leader can be designated to be any participant 20-1 . . . n, and the state of the map can be broadcast directly to other participants 20-2, 3, 4 and 5 or transmitted via other means, such as email or web link for real-time or future use.

Leader 20-1 initiates a record the "state of the map" control from his geobrowser which will record a configuration snapshot 17 on the Host 10 server and locally on the user's machine if desired. The recording of configuration snapshot by the Lead can be set to automatically record it periodically if desired or on demand. The configuration snapshot 17 is created by reading the current state of the map on 30-1, and not from the command stack on Host 10 (as in FIG. 5). Either the client station 20-1 or code on Host 10 can create this configuration snapshot 17, which includes but is not limited to: latest POV (or map extent), layer loads, layer stacking, current layer visibilities, drawings, annotations, animation state and current time and date displayed. As above, the execution of the state replication on client stations 20-2, 3, 4 and 5 can be performed in different ways:

In the case of client station 20-2, the 20-2 interface will receive the "replicate state" command sent before by the Lead and read the necessary commands from the configuration snapshot 17 on Host 10 to make the necessary changes to 30-2 to replicate the state of 30-1. Client station 20-3 will interpret the State Commands directly from the State Commands configuration snapshot 17 saved on the Host 10. This can be done real time during a collaboration by having the client station 20-3 periodically monitor the configuration snapshot 17 for changes or new configuration snapshots, or at a future time on demand.

Client station 20-4 receives the configuration snapshot either from the Host 10 or from the Leader 20-1 via email transmission. The client station 20-4 can connect to the email server directly or have the information fed by the user.

Client station 20-5 checks the server periodically for any changes to configuration snapshot 17 and immediately executes a state replication on 30-5 to replicate 30-1 when a change of the configuration snapshot 17 or a new configuration snapshot 17 is detected on Host 10. This can be done real time during a collaboration, or at a displaced time.

Again the Leader can be designated to be any participant 20-1 . . . n. The state of the map can be broadcast directly to other participants 20-2, 3, 4 and 5 or transmitted via other means, such as email or by web link for real-time or future use.

CMM Session Manager 33

Each CMM 30 includes a supplemental session manager graphical user interface (GUI) that controls and manages the collaborative session(s), and which provides an expandable palette of tools to manipulate the geobrowser.

Figure 7:
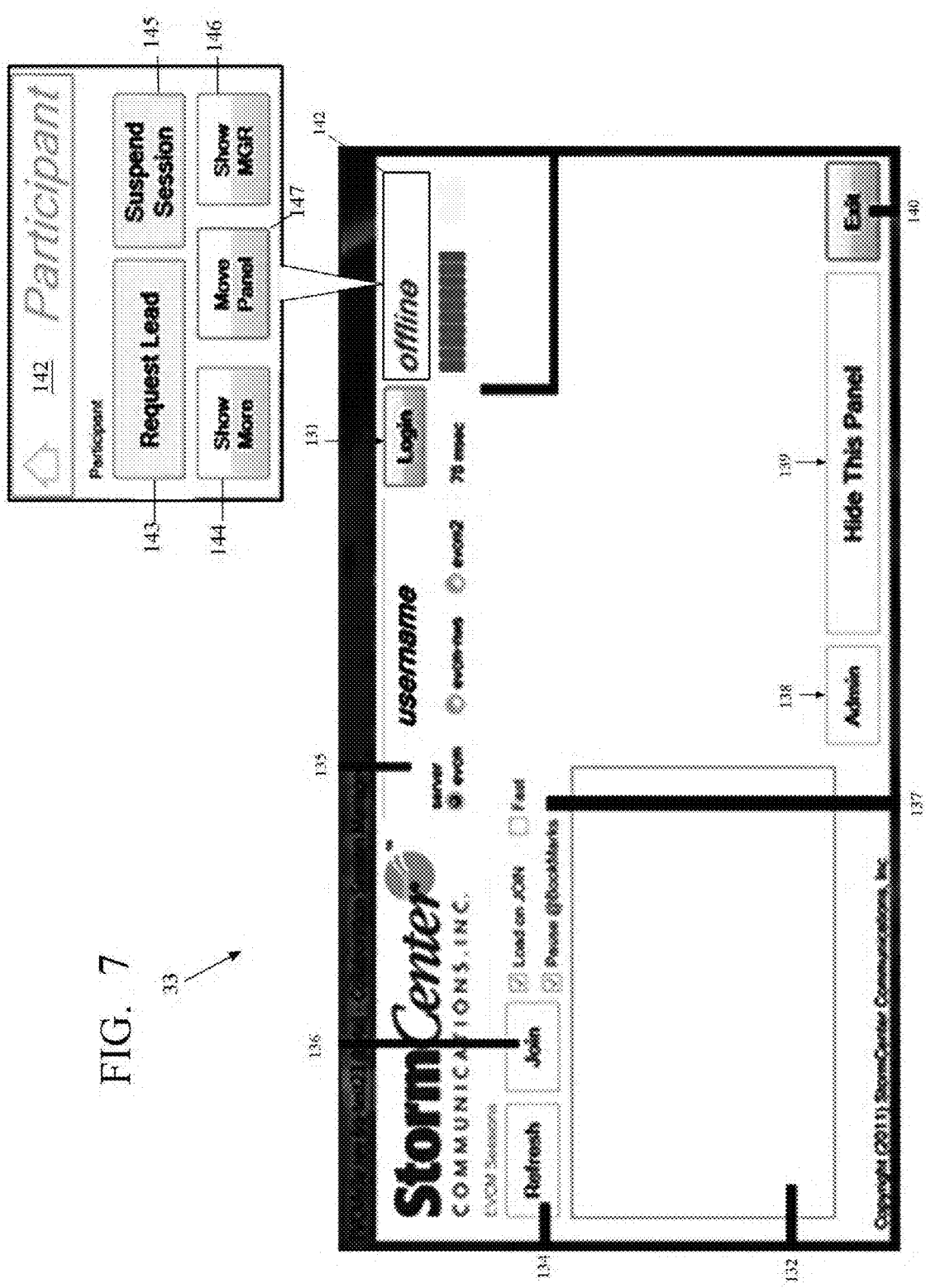
FIG. 7 is a screen shot of an exemplary Communication Management Module (CMM) 30 session manager 33.

FIG. 7 is a screen shot of an exemplary CMM 30 session manager 33. Upon startup, the session manager 33 constructs a web-based GUI which is designed to be the top window over all other running programs. The GUI may embed the geobrowser (here the Google Earth™) virtual globe within itself. The session manager 33 allows logging in and out, changing servers, joining and quitting sessions, viewing session commands log entries for the current session and exiting the program. Thus, the session manager 33 includes a control 131 for authenticating the user (logging in and out), a window 132 for displaying a list of all currently-ongoing collaborative sessions, a refresh control 134 for refreshing the list in window 132, and a Join control 136 for allowing the user to highlight a selected session and join it. The illustrated session manager 33 additionally allows a login selection 135 from multiple Host 10 servers to balance load or in case of network disruptions due to an emergency. The user will enter the assigned Login username into the top right box 131 select a server 135 (here evcm, evcm-nws, or evcm2), then click the Login button. Once logged in, a list of Sessions will appear in the session list window 132. The user selects a session by clicking its name once. The session name becomes highlighted, and the Join button 136 becomes available. Additional selections 137 provide a choice of how to join. If the user chooses to "Load on JOIN" (default) the session manager 33 will load the entire session command files from the Host 10 to catch up to the current point of the collaboration session. If the user chooses "Fast" he will enter a session at its current point without loading any data that has already been shared. The user may choose "Pause @BookMarks" to pause at each pre-set bookmark established by the creator of the session. They click the Join button 136 to join in the collaboration session. The Join button then becomes a Quit button for quitting the collaboration session. The Hide This Panel control 139 closes the session manager 33 without logging out of the session. The session manager GUI 33 can be reinitiated at any time from a Participant/Leader panel.

The Participant/Leader Banner 142 displays connection status (here offline). However, upon joining a session, the banner will read "Participant" when the user is collaborating in the session or "Leader" if the user is leading the session. Clicking on this button once while connected opens a drop down list of additional commands shown at the top right inset.

The Suspend Session control 145 allows the participant to pause the connection to the web Host 10 (at which point the control changes to "Engage Session", and the session can be resumed by clicking this button again). By selecting the Suspend Session control 145 the user effectively enters an off-line mode and disconnects from the Host 10 that is running the collaboration session. Of course, any activity that occurs in the collaboration session while in suspended mode will not be collected or displayed in that user's geobrowser. Upon re-engaging, the user re-joins the collaboration session and is automatically caught up as each intervening step that took place during the suspension is loaded.

The Move Panel control 147 allows the user to click-and-drag the window to a different location.

The Show MGR control 146 launches the Session Manager window 33 described above, if the user has chosen to Hide the Panel.

The Show More control 144 further expands the view of this window to provide a more in-depth array of collaboration tools. The collaboration tools provided depend on whether the Client 20 is the designated Leader of the collaboration, or just a participant as indicated in Banner 142.

As described below, the session manager 33 expands to provide controls to the Leader for manipulating the COP. These controls generally allow the following changes:

Point Of View (POV): Changing the position of the camera view, allowing users to move around and zoom in and out of the geobrowser, as well as pitch, roll, yaw, tilt, azimuth, and altitude.

Load data layers: Adding layers of data on the geobrowser.

Change data layer visibility: Turn on or off any of the layers currently available, or changing the transparency level of any layer, changing colors, fonts, etc.

Animation tools: Play and pause datasets that can animate though time, and changing animation settings, such as animation speed, timesteps, irregular time sets, set time, and play/pause.

Drawing and annotation tool: to add and edit drawings, text, icons and annotations on the geobrowser, balloon/info windows, etc., all selectively geo-synchronized across different geobrowsers or not (screen draws).

These and other manipulation functions are described below.

Figures 8, 9:
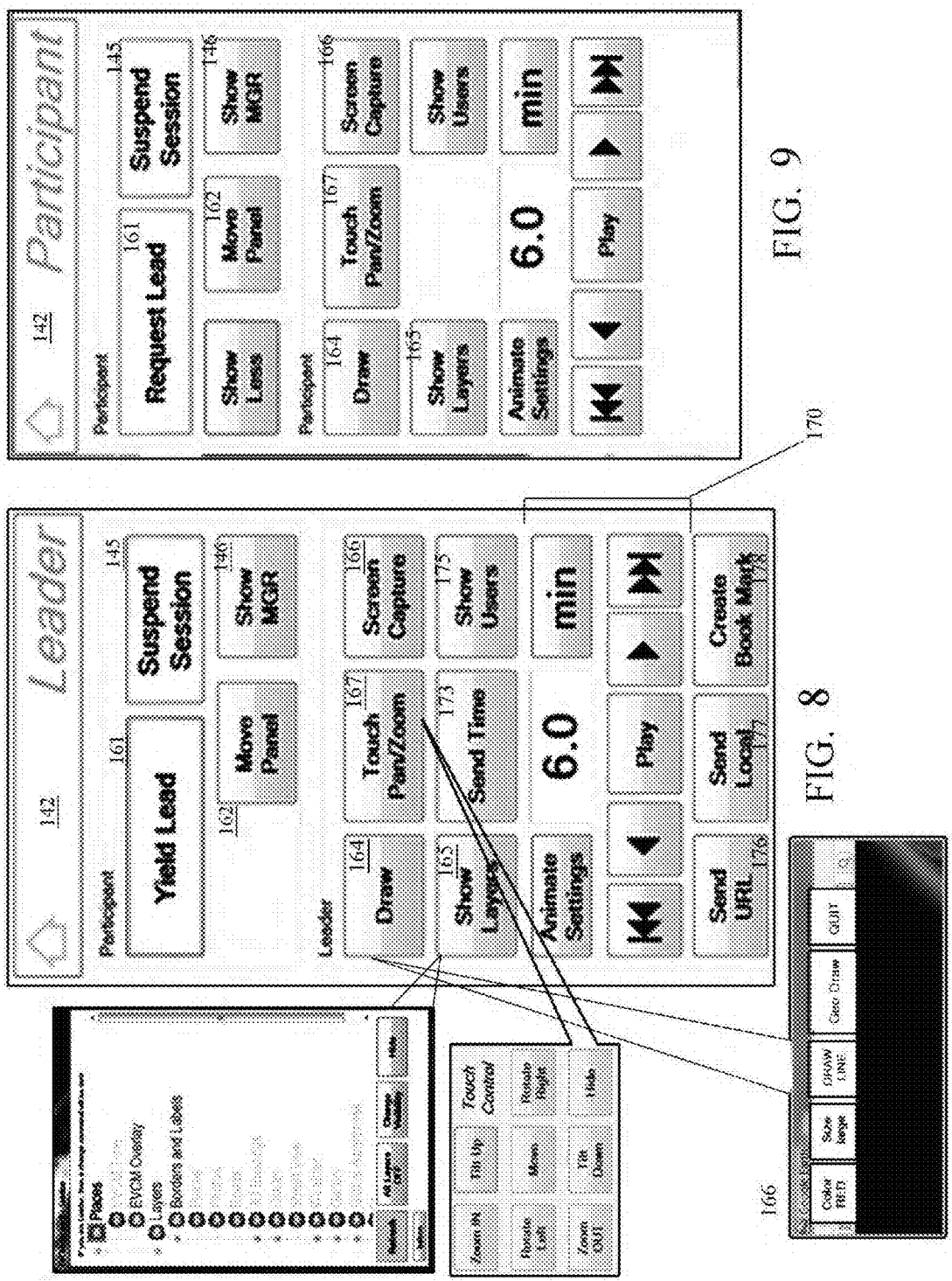
FIG. 8 displays the full set of collaboration tools available to the designated Leader (with insets illustrating expanded menus). Different tools are available for different geobrowsers, depending on their capabilities.
FIG. 9 displays the more limited subset of collaboration tools available to the follower Participants.

FIG. 8 displays the collaboration tools available to the designated Leader (with insets illustrating expanded menus), and FIG. 9 displays the more limited subset of collaboration tools available to the followers:

The Suspend/Engage Session control 145 and the Show MGR control 146 are as described above.

The Lead control 161 toggles between Request Lead (FIG. 9), and Yield Lead (FIG. 8), with the current status shown in the Participant/Leader Banner 142 above. During a collaboration session, there are multiple Participants and one Leader. Upon joining, everyone is a Participant until one requests to lead the session. Clicking on 'Request Lead' will bring a 'Waiting (Quit)' message in yellow in the Participant/Leader Banner 142. If this is selected before the request for the lead is complete, the request is canceled. After becoming the Leader, the 161 button reads 'Yield Lead' in green (as shown in FIG. 8). If a Participant hits the "Request Lead" Button to assume Leadership of the session, the current Leader must hit the corresponding "Release Lead" button to give up the lead and relinquish it to the Participant.

The Leader has exclusive abilities that no other collaborator possesses: moving the globe view, loading a KML or URL file, Drawing and sending text, changing the visibility of the Layers loaded in the collaboration, and controlling the looping of animations.

Clicking the Draw control 164 initiates the Draw Tool 166 shown in the bottom left inset (FIG. 8). The Draw tool displays 5 different buttons atop the geobrowser. Only the Leader can draw. If another Participant wants to draw the Lead function must first be relinquished to him. When the Leader makes a drawing, a new drawing file (kml, annotation, or other geolocated file) is created with the drawing, is loaded onto the command stack at Host 10, and then this file is retrieved by all the participants.

The first button is the Color button, which allows the Leader to change the color of the pen used for drawing. They select the color by clicking on the button, which opens a drop-down palette for selection. The selected color is displayed in the top button.

Selecting Size gives the Leader a choice of three different drawing Pen thicknesses, or font size for text: small, medium, and large. If desired, a more elaborate "fonts" selection may be provided to adjust text (font) and Icon (Pen) size for each of the three drawing pen sizes.

Clicking Line selection allows the user to draw lines.

Clicking Text allows the user to add text with or without an icon on the map. Thus, to place text and/or icons on the globe, the user selects Text under the "Draw" selection. Defaults may be suggested, such as a default icon such as a "shaded dot", and/or default text such as "abc." In each case clicking the default selection will open a text/icon library and allow other selections. The Clear selection clears all previously-created drawings. The Square selection allows the user to click-and-drag a square or rectangle drawing onto the geobrowser. The Circle selection allows the user to click-and-drag a circle drawing onto the geobrowser.

Referring back to the lower Draw Tools inset 166 of FIG. 8, the default draw mode is "Geo Draw", as shown selected in the fourth button from left. Geo Draw allows the Leader to draw or place the above-described text or icons on the geobrowser that are geo-referenced on the globe or map. Despite subsequent moving of the globe or zooming in and out, the drawing maintains its original placement on the map or virtual globe. By clicking on the "Geo Draw" button, other drawing mode options become available, displayed in a drop-down list, with the current selection appearing in the top box.

A second draw mode option is Screen Draw which, unlike Geo Draw, keeps the drawing or text stationary on the screen. The drawing does not move or change location despite moving the map or virtual globe or zooming in and out during the session. This is useful for titles or key information that the Leader may want to be seen throughout the session.

A third draw mode is Spline. After setting the line color and width, the Spline selection allows entry of cardinal points onto the drawing surface. The cardinal points may be identified by text (an Icon or logo selected from previous Text command). The user can place the Splines at any altitude and, once at least three points are entered, they can click a "Make Spline" selection to draw a cardinal spline, e.g., a curve that passes smoothly through the defined cardinal points.

All of the foregoing objects drawn using the Draw Tool 166 are automatically saved as individual geolocated draw files, such as, for example, Keyhole Markup Language (KML) or other geolocated files. KML is an international standard of the Open Geospatial Consortium and is a known file format used to display geographic data in geobrowsers such as Google Earth. A KML file is processed in much the same way that HTML (and XML) files are processed by web browsers. Each KML file becomes a layer to be used in the geobrowser.

Referring back to FIG. 8, the Show Layers control 165 can be used to selectively view or not view any of the layers or above-drawn objects. Clicking on "Show Layers" control 165 opens a Sidebar window (inset top left) which lists a tree-view index listing all defined layers. Buttons at bottom allow the user to turn off layers, change their visibility, hide them, and refresh the list. There are two different parent directories: Places (where new user-defined layers are listed) and Layers (for embedded ASP-defined layers such as places of interest and other features). Each layer loaded into the CMM 30 by the Leader will be listed in the Show Layers Sidebar. Clicking "Refresh" (bottom) reloads the list of layers. The Leader is free to turn layers on and off by clicking in the Show Layers Sidebar to select the layer and then clicking the "Change Visibility" button at bottom. The Hide All Layers button turns off the visibility of all the layers. As seen in FIG. 9 the Participants also have a Show Layers control 165 which opens the Show Layers Sidebar, but the bottom buttons are not available to Participants.

Clicking on the Screen Capture button 166 allows the user take a snapshot of the user's desktop with the geobrowser and the current view and layer visibilities. For Participants, the captured image appears in a separate window with the options "File," "Share," and "Help (a help function)." Clicking on "File" allows them to "Save As" a file on the local client 20 hard drive. The default image type is PNG, but the file format can also be JPEG, GIF or any other image format. If the Leader clicks Screen Capture 166 the captured image is automatically saved in two locations as three separate files, at one time, and immediately made available for sharing over the Internet. The file is saved locally, as well as on Host 10. Thus, if the Leader clicks "Share" the file may be viewed by other Participants. The "Share" control is a Leader-only function that is disabled for Participants. This function allows other participants, who do not have the tool installed, to be able to follow the collaboration session using any web browser. The Screen Capture 166 function can be programmed to automatically capture screen images at pre-determined intervals.

The Touch Pan/Zoom control 167 gives the user control of their global location and view in the geobrowser. By clicking on the "Touch Pan/Zoom" button 167 on the Leader panel FIG. 8, a new window will pop open titled "Touch Control" (middle left inset). This panel provides Touch Controls for changing the angle of the view of the geobrowser. Tilting Up or Down changes the view from aerial to above the map or virtual globe, in 3D space. Rotating Left or Right moves the map or spins the virtual globe left or right. Users may also Zoom In or Out to a location on the map or virtual globe. Users may click and drag the panel to a different location on the desktop by using the "Move" button. When finished adjusting the view, users click "Hide" to close the Touch Control window.

Figure 10:
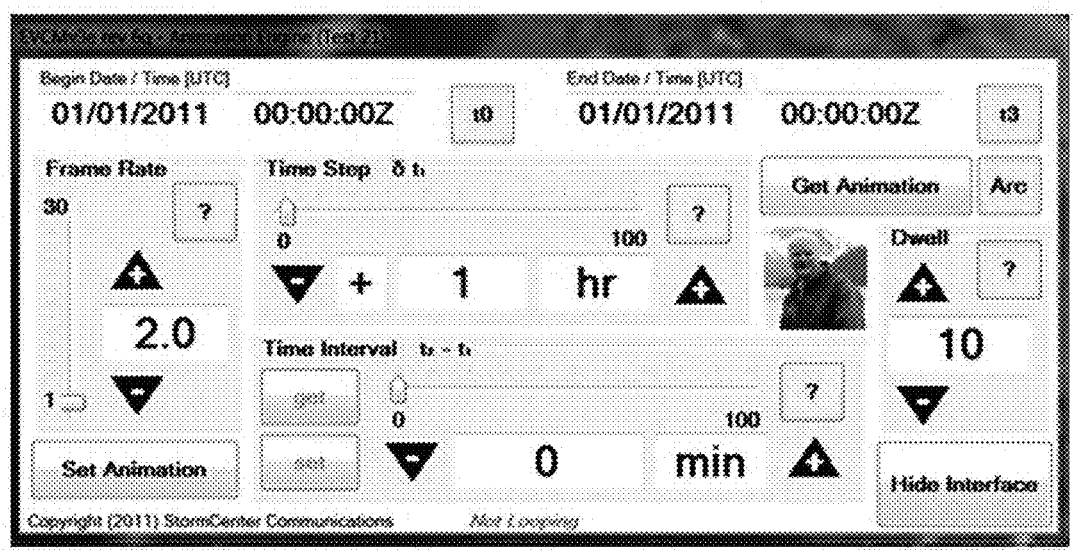
FIG. 10 is a screen shot if the Animate window from which the user can control the settings for animating a loop.

The Animate Controls 170 allows control over time animations loaded in the collaboration session. Clicking the Animate Settings button launches the Animate window of FIG. 10, from which the user can control the settings for animating and looping.

The Time Step control allows text entry or slider control to define the temporal distance between frames during the animation sequence. This interface allows the user to set the direction (+ is forward, − is reverse), and the magnitude of the time difference between frames in units of the user's choice.

The Animation Frame Rate likewise allows text entry or slider control to define the speed for frame advance during the animation sequence. This interface allows the user to set the magnitude of the frame rate in units of frames per second.

The Time Interval shows (Get) and/or defines (Set) the temporal separation of the current time interval (t2−t1) or "span" displayed by the geobrowser. During animation, the length of this time interval is constant as time t1 and t2 are advanced in increments or decrements of Time Step. This interface allows the user to set the magnitude of the time span in units of the user's choice.

The Animation "Dwell" (middle right) defines a wait time at the end of the animation sequence before starting the animation again (loop). This interface allows the user to set the magnitude of the wait in an integer Number of Time Steps.

Referring back to FIG. 8, the Leader can click the "Show Users" 169 button which pops open a Session Portal window displaying the user names of the participants currently logged into the session. Clicking on the user name displays a web page with contact information for that participant and other relevant information (user location, status, etc.).

Once a session has been created and entered by the user, it can be populated with data in the form of Open Geospatial Consortium (OGC) compliant KML/KMZ files and WMS (Web Mapping Service) links, or any geospatial files compatible with the geobrowsers (e.g., Google® Earth, World Wind, Google® Maps, ESRI ArcExplorer, ESRI desktop, ESRI Flex Viewers, API, etc.). There are two ways in which a session Leader can load files: through a full web URL, or from a file saved locally on the Leader's computer 20-1. Four buttons are made available at the bottom of the Leader/Participant window as Leader (FIG. 8): Send Time 173, Send URL 176, Send Local 177, and Create Book Mark 178.

"Send Time" 173 is used to unify the Participants to the same time in the geobrowser time scale bar as the Leader. When multiple products have been loaded into a session with time stamps, the collaborators may not be viewing the same frame(s) in the time series as the others or the Leader. The Leader can prevent/correct this problem by clicking "Send Time" 173 after each time-stamped product is loaded in the session.

By clicking on Send URL 176, the Leader will launch a new window titled "Load KML (URL)." A fully customizable browser window with direct links to data resources, in addition to a text box is available for entering the web address that links directly to a KML or KMZ file. Using the browser window, the Leader navigates to, manually enters or pastes the URL for a KML/KMZ file. The "GOTO URL" option will prompt the user to either open the file, or save it locally on the hard drive. The "Send URL" option will send the link to Host 10 as a command for retrieval by all collaborating client CMMs 30, and share it for collaboration. The KML/KMZ files and datasets associated are downloaded directly from the Internet link (URL) by all the collaborators.

By clicking on Send Local button 177, the Leader will launch a new window titled "Load KML (Local)." A folder and file browser and a text box is available for entering the file destination that links directly to a local KML or KMZ file. Since these KML/KMZ files are stored on the Leader computer and are shared through the Host 10, each file must be first uploaded to and downloaded from the Host 10, and then loaded to the CMM 30 on client stations 20. Local KML/KMZ files sent in a collaboration can link to external data from the Internet if desired.

At any time a placeholder can be created by clicking "Create Book Mark" button 178. This opens a pop-up box that allows the Leader to type the name of the Book Mark and save it. The bookmark serves as a pause point during the loading of a session. When others log into and join that session, and select "Pause @ Bookmarks," each data item will load until it gets to the book mark that the Leader created. It will stop at the book mark until the participant clicks "Continue" in the pop-up window containing the name of the bookmark. Multiple bookmarks can be created in any session by the Leader, either ahead of time before a briefing or during collaboration.

Example 1

Figure 11:
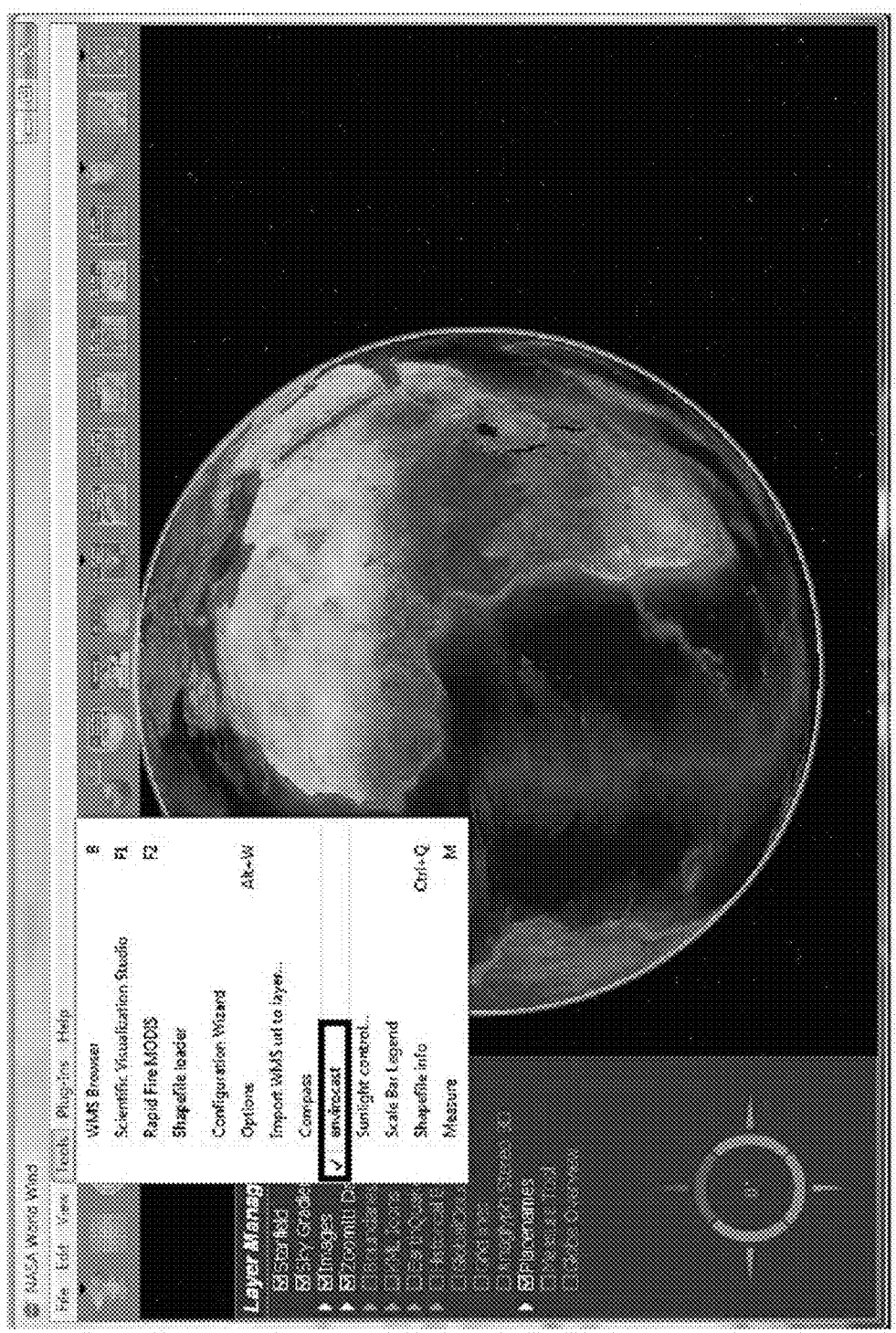
FIGS. 11-12 are screen shots illustrating the CMM 30 Plugin interface for World Wind WW.Net.

As an example, a World Wind Plugin was developed for the WW.Net version 1.4 in the C# language using Visual Studio 2008. The CMM plugin 30 can be loaded via the World Wind geobrowser Tools menu by clicking the appropriate plugin entry, labeled for example "Envirocast" as shown in FIG. 11.

Figure 12:

This opens the session manager graphical user interface (GUI) shown in FIG. 12 for controlling and managing the collaborative session(s). As above, the session manager GUI 33 provides controls for joining, following, and leading a collaboration session. To join an existing session on network location "evcm2", user enters the session title (e.g. "test01") and clicks the "Join" command button.

The interface will advance to the first sequence command 000000 of the master Session command files (for example, 0,0, POV) and World Wind initializes to the default position which is shown in the POV textBox listings as described below. The User then clicks the "Advance" command button to step through the session sequence commands listed in the lower left hand corner of the interface 33.

As seen at right, there are separate control buttons (described above) to allow the lead collaborator to obtain and/or change the Point Of View (POV), e.g., the camera view, allowing users to move around and zoom in and out of the geobrowser.

The final WW.Net implementation defines POV in using all of the following parameters: seq#, time, pov, Lon, Lat, alt, tilt, head, [speed] where:
seq# sequence command number {0, 1, 2 . . . }
time reserved (time stamp for sequence command) (currently not used)
pov "Point Of View"
Lon Longitude in decimal degrees −95.26548
Lat Latitude in decimal degrees 38.95939
alt Altitude of pov above focus point in meters 10000000.0 [m]
tilt pitch of the globe about focus point in decimal degrees 0.0
head bearing of the globe about focus point in decimal degrees 0.0 speed for movement to pov, as defined by Google Earth. 1 sec There is a checkbox (bottom right) for Auto (timer) Load. When checked the auto timer steps through the command stack one-by-one without manual intervention. This has the same effect as user pressing the Advance button once per second.

If user is not following a session, user can get/set the POV at any time using the "get POV" and "set POV" command buttons.

The user can enter any sequence number and then click "Advance" to jump to any existing sequence number in the session. Note that the max sequence number is provided on the left side of the interface, just under the session name.

Figure 13:
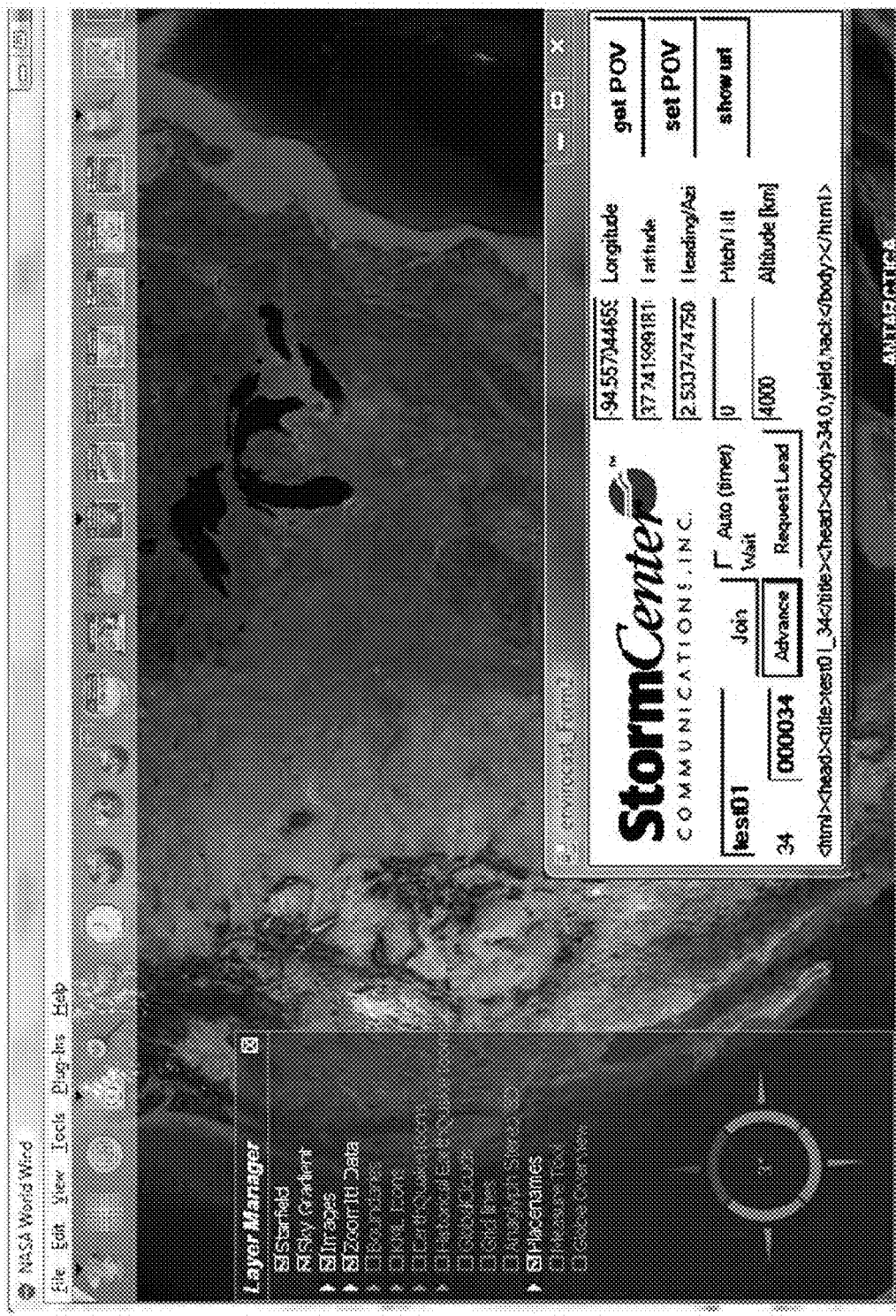
FIG. 13 is a screenshot of an active collaboration between WW.Net client 20 (as per FIGS. 9-10.
Figure 14:
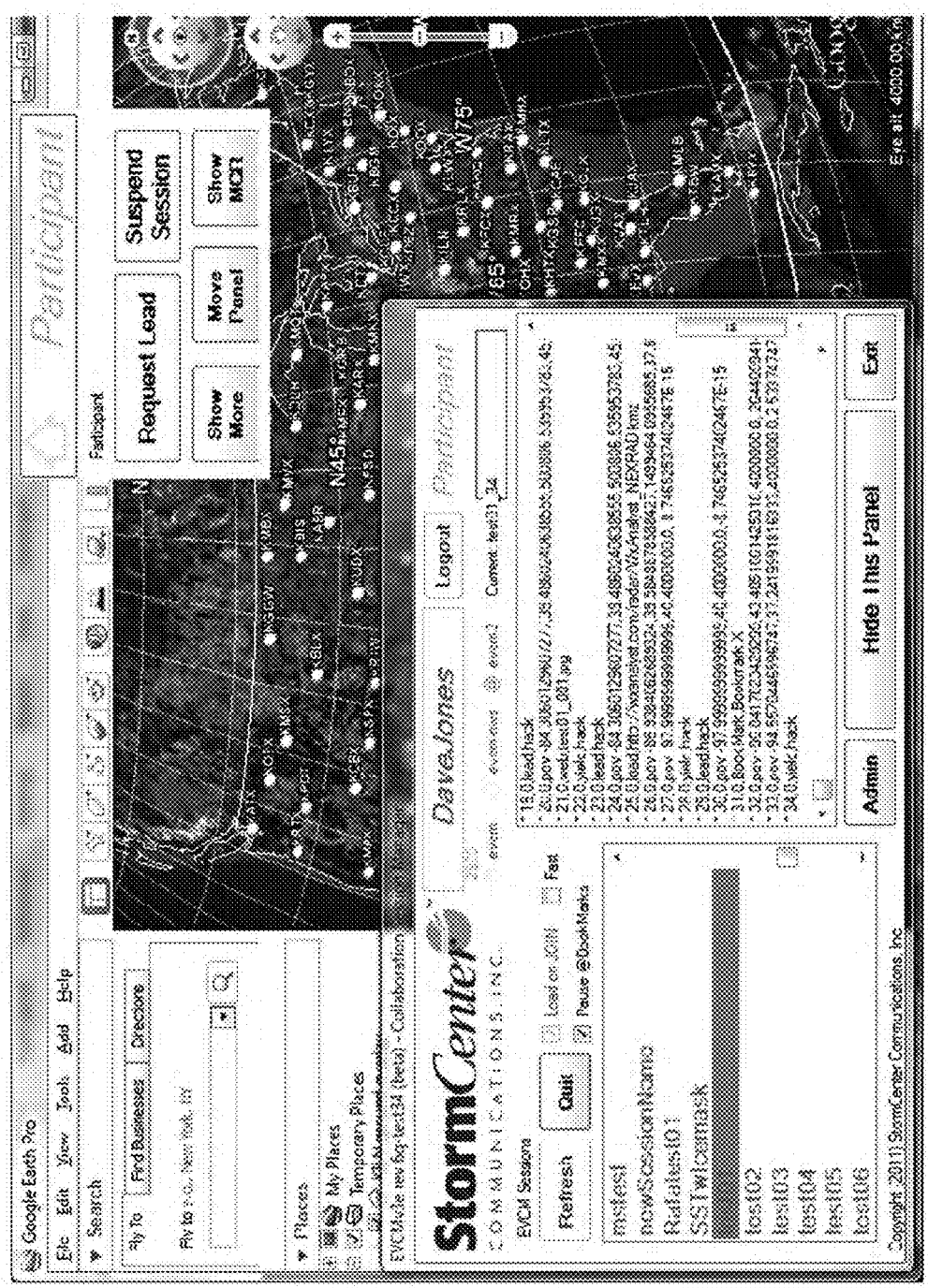
FIG. 14 shows the same collaboration as FIG. 13 with Google Earth client 20 of FIGS. 5-7.

FIG. 13 is a screenshot of an active collaboration between WW.Net client 20 (as per World Wind Plugin of Example 2), and FIG. 14 shows the same collaboration with Google Earth client 20 of Example 1. If the collaboration session is live, then the interface will be able to follow the session either manually by using the "Advance" button, or automatically by enabling the timer checkbox. The client 20 maintains full function Google Earth capability (FIG. 14) and a different client maintains full function WW.Net test capability (FIG. 13). The WW.Net user can take the Lead using the "Request Lead" button. The WW.net StormCenter Plugin (FIG. 13) will then create POV and Load commands as directed and write them to the Host 10 session command stack.

Example 2

For World Wind JAVA (WWjava) a similar plugin has been developed, compiled and run using both the NetBeans Integrated Development Environment (IDE) and Eclipse IDE. The java CMM 30 plugin runs from Eclipse to create a similar control interface GUI.

Several successful collaborations have been performed both over local networks and over the interne on multiple Microsoft Windows® platforms (XP, Vista and Windows 7). Multiple collaborative POV changes and dataset sharing were performed between three different geobrowsers:
World Wind 1.4 (WW.NET) with the Example 2.NET plugin CMM 30.
World Wind Java (WWJava) with the Example 3 CMM 30 plugin
Google Earth with the Example 1 API CMM 30.

All collaboration sessions were conducted by a lead collaborator with any number of collaboration participants, all using the foregoing geobrowsers of choice. Regardless of geobrowser, the cross-platform architecture of the present system allows each participant to connect to a collaboration session and all the functions performed on the lead collaborators geobrowser are executed across all the collaboration participants' geobrowsers. Dataset loading, layer stacking, Point of View (POV) changes, animation settings and annotations are replicated across all the connected geobrowsers, effectively creating a true geospatial Common Operating Picture (COP) and full real-time situational awareness. Moreover, the lead/follow protocol by which lead collaborator functions can be passed on to any of the other participants in the collaboration at any time builds upon the collaborative COP.

It should now be apparent that the above-described geobrowser collaboration system provides both the platform and protocol for synchronizing and sharing information among multiple remote geobrowsers in a most effective collaborative way, which greatly facilitates decision-making in emergency and other situations. The lead/follow protocol in which all the functions performed on the leader's geobrowser are executed across all the collaboration participants' geobrowsers, including dataset loading, layer stacking, Point of View (POV) changes, animation settings and annotations, creates a true geospatial Common Operating Picture (COP) for the most comprehensive situational awareness possible.

We claim:
1. A collaboration system for allowing multiple geobrowsers to communicate over local networks and the Internet to create a real collaborative experience over a plurality of computer devices, comprising:
a web-enabled Host computer;
a plurality of remote client computer stations in communication with said Host, each of said plurality of remote client stations running a native geobrowser application for displaying a user-interface comprising a virtual globe or two-dimensional map;
a communication management module running locally or as a web plug-in on each of said plurality of remote client stations and capable of controlling the respective geobrowser application for providing a local collaboration user interface on said client stations, said communication management module communicating geobrowser commands entered at each of said remote client stations to said Host, receiving geobrowser commands from said Host, and executing geobrowser commands received from said Host on said native geobrowser application;
software resident on said web-enabled Host computer for designating any one of said plurality of remote client stations as a lead collaborator, recording a command stack consisting of all geobrowser control commands executed by designated lead collaborators, and for communicating said recorded command stack out to the other of said plurality of remote client stations for execution on their said native geobrowser applications.
2. The collaboration system according to claim 1, wherein at least two of said plurality of remote client stations experi- ence the same collaborative experience on the same or different native geobrowser applications.

3. The collaboration system according to claim 1, wherein any functions performed on the lead collaborator remote client station geobrowser are executed on all the other of said plurality of remote client stations.

4. The collaboration system according to claim 3, wherein said functions include any from among a group consisting of dataset loading, layer stacking, Point of View (POV) change, map extent, animation setting change, and annotations.

5. The collaboration system according to claim 1, wherein the other of said plurality of remote client stations periodically poll said host computer to determine when a geobrowser control command has been added to said command stack, and upon finding one or more new control command(s) reads them into a local copy of said command stack and immediately executes said new control commend(s).

6. The collaboration system according to claim 1, wherein only one of said plurality of remote client stations can be designated lead collaborator at a time.

7. The collaboration system according to claim 6, wherein the lead collaborator can pass the lead collaborator designation to any of the other of said plurality of remote client stations.

8. The collaboration system according to claim 1, wherein said communication management module comprises a graphical user interface (GUI) with a palette of software tools to control and manages the collaborative session.

9. The collaboration system according to claim 8, wherein said palette of software tools includes a first tool to record a state of the map comprising a comprehensive session content and configuration snapshot at a given point in time.

10. The collaboration system according to claim 9, wherein said recorded state of the map can be broadcast to any of the other of said plurality of remote client stations to locally reproduce a collaborative session on demand.

11. The collaboration system according to claim 8, wherein said palette of software tools includes a second tool to allow said lead collaborator to draw atop his geobrowser.

12. The collaboration system according to claim 11, wherein said second tool allows said lead collaborator to select to draw an object geo-referenced to the geobrowser globe or map, or to draw an object stationary on the remote client station display.

13. The collaboration system according to claim 11, wherein said second tool allows said lead collaborator to define cardinal points on the remote client station display and draw a cardinal spline through the defined points.

14. A method for geobrowser collaboration, comprising the steps of:
connecting a plurality of remote client computers each running a geobrowser user interface to a host computer server via a communications network,
designating one of said remote client computers as a lead collaborator;
said lead collaborator conducting a geobrowser session and issuing control commands to said geobrowser user interface, and simultaneously transmitting said control commands to said host computer;
said host computer accepting only authenticated geobrowser control commands from the designated lead collaborator and recording a collaboration session command stack consisting of all geobrowser control commands executed by said designated leader;
communicating said recorded collaboration session command stack to all the other of said plurality of remote client computers and maintaining a local copy of said collaboration session command stack at each of the other of said plurality of remote client computers;
each of the other of said plurality of remote client computers conducting a geobrowser session at least comprising duplicating the geobrowser session of said lead collaborator by automatic execution of the control commands contained in said local copy of said collaboration session command stack.

15. The method of claim 14, further comprising the steps of:
one of the other remote client computers requesting to be lead collaborator;
said lead collaborator relinquishing its designation as lead collaborator to the requesting client computer; and
said host computer designating said requesting remote client computers as a second lead collaborator.

16. The method of claim 14, further comprising the steps of:
said host computer only accepting authenticated commands from the second designated lead collaborator;
appending all control commands from said second designated lead collaborator to said collaboration session command stack.

17. A computer implemented system for geobrowser collaboration, comprising:
a plurality of remote client computers each running geobrowser software;
a host computer server communicatively coupled to said remote client computers via a communications network, said host computer server hosting client management control software comprising computer instructions stored on non-transitory computer memory for carrying out the steps of:
allowing a first designation of one of said remote client computers as a first lead collaborator;
accepting authenticated geobrowser control commands only from the designated first lead collaborator;
recording a collaboration session command stack consisting of all geobrowser control commands from said designated first lead collaborator;
allowing a second designation of another of said remote client computers as a second lead collaborator;
accepting authenticated commands only from the second designated lead collaborator;
appending all session commands from said second designated lead collaborator to said collaboration session command stack;
communicating said recorded collaboration session command stack to all the other of said plurality of remote client computers for controlling the geobrowser software at each client computer in accordance with the session commands in said command stack to create a true collaborative geospatial Common Operating Picture (COP) among all connected client computers.

18. The computer implemented system for geobrowser collaboration according to claim 17, wherein all commands performed on the designated lead collaborator's geobrowser are executed across all the other remote client computer geobrowsers.

19. The computer implemented system for geobrowser collaboration according to claim 18, wherein said commands include any one or more from the group consisting of dataset loading, layer stacking, Point of View (POV) change, map extent, changing animation settings, and annotation.

20. The computer implemented system for geobrowser collaboration according to claim 17, wherein each of said plurality of remote client computers each runs a session manager graphical user interface (GUI) that controls and manages the collaborative session(s), and which provides an expandable palette of tools to manipulate the geobrowser.

21. The computer implemented system for geobrowser collaboration according to claim 20, wherein said palette of software tools includes a first tool to record a state of the map comprising a comprehensive session content and configuration snapshot at a given point in time.

22. The computer implemented system for geobrowser collaboration according to claim 20, wherein said palette of software tools includes a second tool to allow said lead collaborator to draw an object geo-referenced to the geobrowser globe or map, or to draw an object stationary on the remote client station display.

23. The computer implemented system for geobrowser collaboration according to claim 17, wherein each of said plurality of remote client computers periodically polls said command stack and uploads and executes new commands.

* * * * *